(12) United States Patent
Shen

(10) Patent No.: US 6,498,441 B1
(45) Date of Patent: Dec. 24, 2002

(54) METHOD FOR COLORING MIXING OF HID LAMPS OPERATED AT VHF FREQUENCIES USING DUTY CYCLE MODULATION

(75) Inventor: Eric Shen, Scarborough, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/927,218

(22) Filed: Aug. 10, 2001

(51) Int. Cl.[7] ............................................. G05F 1/00
(52) U.S. Cl. ........................ 315/291; 315/219; 315/224
(58) Field of Search ................................. 315/219, 224, 315/246, 291

(56) References Cited

U.S. PATENT DOCUMENTS 5,493,182 A * 2/1996 Sowa et al. ................. 315/291
6,184,633 B1 * 2/2001 Kramer ....................... 315/246
6,388,398 B1 * 5/2002 Li et al. ...................... 315/194
6,400,100 B1 * 6/2002 Kramer ....................... 315/194

* cited by examiner

Primary Examiner—Tan Ho

(57) ABSTRACT

A method of color mixing a very high frequency operated HID lamp which effectuates power modulation to the HID lamp at a frequency of the second longitudinal acoustic mode by modulating the duty cycle of a half bridge configured resonant inverter. The duty cycle is modulated with a modulation frequency which is substantially one-half the frequency of the second longitudinal acoustic mode of the HID lamp. In operation, exciting the second longitudinal acoustic mode of the HID lamp with the half bridge configured resonant inverter operated with a modulated duty cycle achieves color mixing along a vertical axis of the HID lamp.

17 Claims, 2 Drawing Sheets

METHOD FOR COLORING MIXING OF HID LAMPS OPERATED AT VHF FREQUENCIES USING DUTY CYCLE MODULATION

FIELD OF THE INVENTION

This invention relates to methods for reducing vertical segregation in high intensity discharge (HID) lamps, and more particularly, to a method for color mixing of HID lamps operated at very high frequencies which employs duty cycle modulation for operation of a half bridge circuit topology of the resonant inverter.

BACKGROUND OF THE INVENTION

High intensity discharge lamps are not typically operated on high frequency sinusoidal waveforms due to instabilities caused by acoustic resonances. In an attempt to overcome such instabilities, the HID lamps can be stabilized by operating the HID lamp at frequencies above its highest acoustic resonance. Operating the HID lamp above its highest acoustic resonance is known as very high frequency (VHF) operation. Nevertheless, the frequencies of the acoustic resonances depend on a variety of factors, one of which includes the dimensions of the lamp and thus varies from one HID lamp to another HID lamp.

Moreover, when HID lamps are operated in a vertical orientation, certain HID lamps display a phenomenon called vertical segregation whereby the color of the light emitted from the HID lamp is not uniform along its vertical axis. As a result, attempts have been made to overcome the disadvantage of vertical segregation. In one such attempt, the second longitudinal acoustic mode is excited to mix the chemistry in the lamp yielding a uniform color along the vertical axis of the HID lamp.

As can be readily seen, it is desirable to operate the HID lamp at VHF and also excite the second longitudinal acoustic mode to create color mixing or, in other words, to minimize, if not essentially eliminate, vertical segregation.

SUMMARY OF THE INVENTION

The present invention contemplates a method of color mixing which includes operating an HID lamp at VHF, and power modulating at a frequency of a second longitudinal acoustic mode of the HID lamp by modulating the duty cycle of a half bridge configured resonant inverter to excite the second longitudinal acoustic mode of the HID lamp to achieve color mixing along a vertical axis of the HID lamp. The method also contemplates the ability to maintain a constant switching frequency of the half bridge configured resonant inverter.

DETAILED DESCRIPTION OF THE INVENTION

Figure 1:
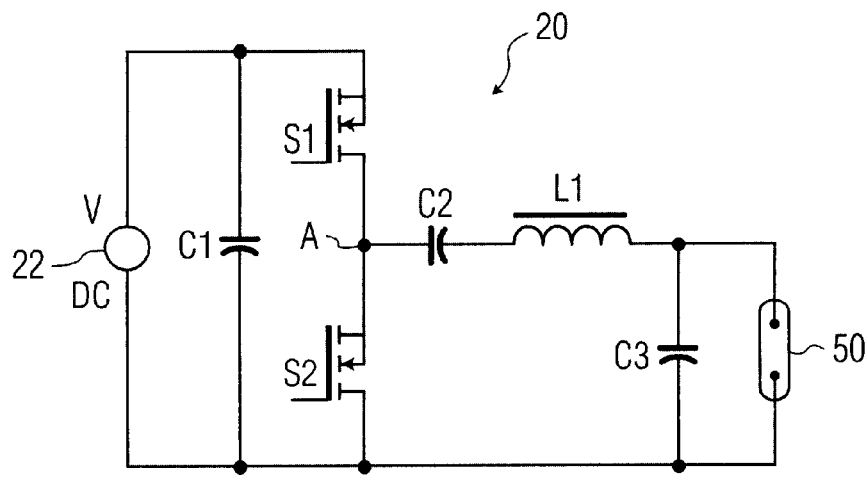
FIG. 1 illustrates a schematic diagram of a conventional resonant inverter.

Referring now to FIG. 1, the schematic diagram of the conventional half bridge configured resonant inverter 20 is shown. The present invention employs a conventional half bridge configured resonant inverter 20 coupled to a high intensity discharge (HID) lamp 50 to carry out the method of the present invention to achieve color mixing by excitation of the second longitudinal acoustic mode. The resonant inverter 20 includes a half bridge circuit with two transistors or switches S1 and S2, which are complementarily switched or driven at VHF with a nominal duty cycle (the amount of time a switch is on) of 50% or 0.5.

Referring still to the schematic diagram, the resonant inverter 20 includes a high DC voltage source 22, which is coupled in parallel with energy storage capacitor C1 and delivers input voltage Vin. The energy storage capacitor C1 is connected in parallel with the half bridge circuit defined by the two transistors or switches S1 and S2. In the exemplary embodiment, transistors or switches S1 and S2 are MOSFETs but may be other suitable power switching devices. Thus, the first terminal and the second terminal of the energy storage capacitor C1 are coupled to the drain of transistor or switch S1 and the source of transistor or switch S2, respectively. The source of transistor or switch S1 is coupled to the drain of transistor or switch S2 via half bridge output node A. The gates of transistors or switches S1 and S2 are coupled to an inverter control circuit (NOT SHOWN) to control the conducting and non-conducting states thereof.

The resonant inverter 20 further includes a DC blocking capacitor C2 having a first terminal coupled to the half bridge output node A and a second terminal coupled to a first terminal of inductor L1 of the main resonant filter. The main resonant filter is defined by inductor L1 and capacitor C3. The HID lamp 50 is coupled in parallel with capacitor C3. The negative terminal of the high DC voltage source 22, the second terminal of the energy storage capacitor C1, the source of transistor or switch S2, and the second terminal of capacitor C3 are tied together.

Figure 2:
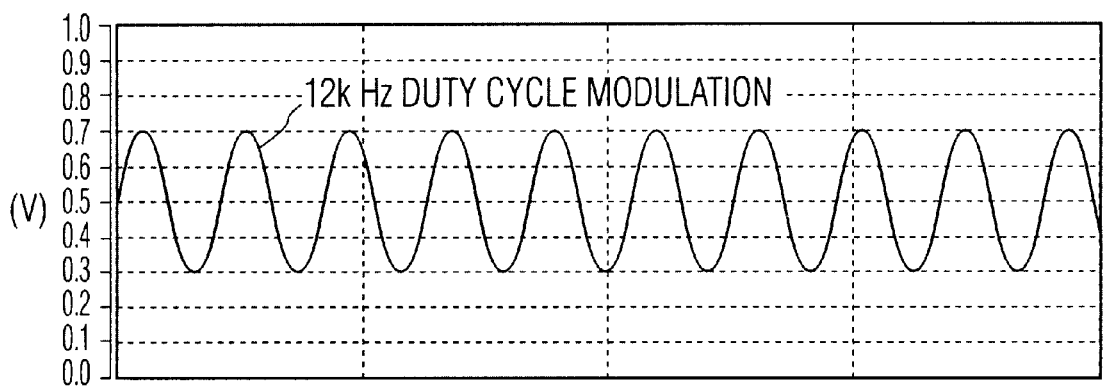
FIG. 2 illustrates the duty cycle modulation waveform of the present invention.
Figure 3:
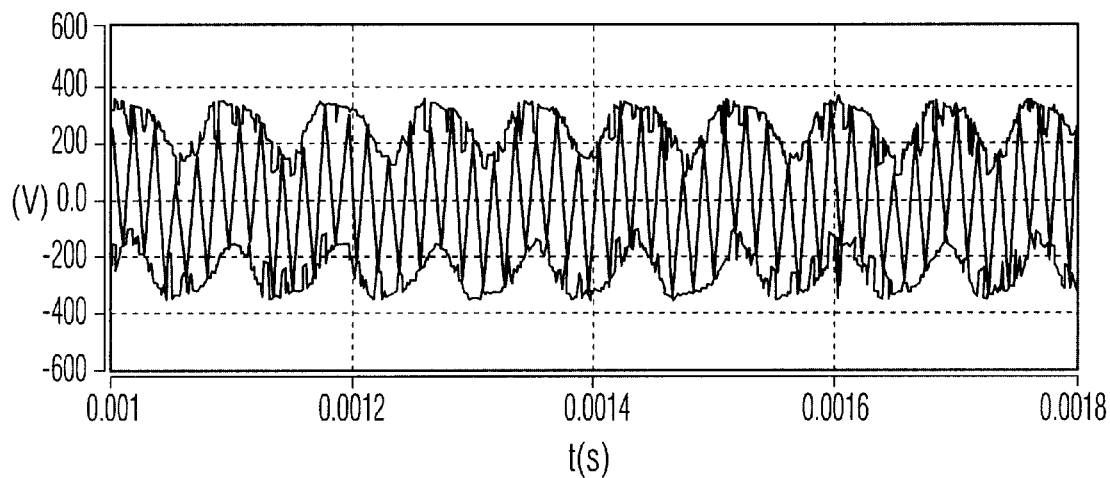
FIG. 3 illustrates the HID lamp voltage waveform over time of the present invention.
Figure 4:
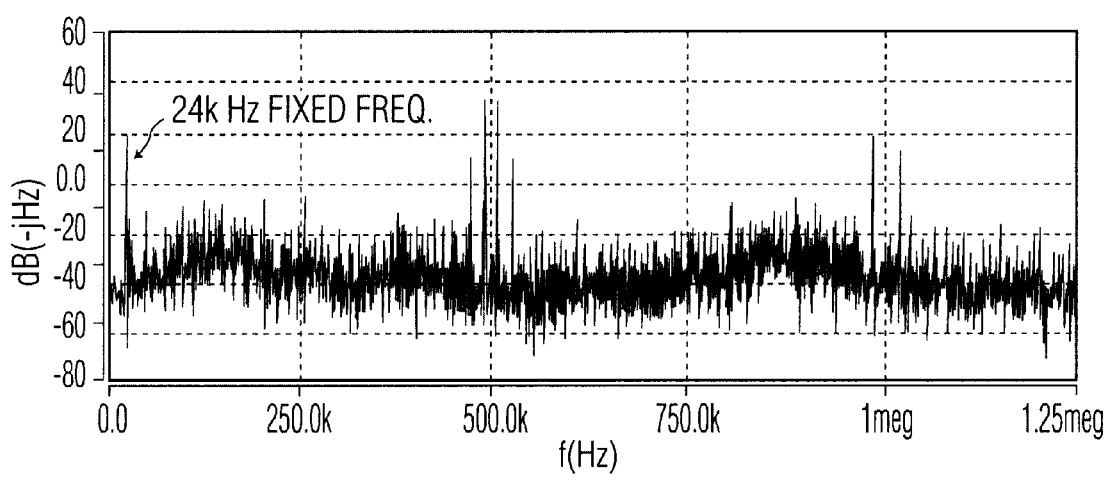
FIG. 4 illustrates the power spectrum waveform over a frequency spectrum of the present invention.

Referring now to FIGS. 2–4, the method of the present invention employing the resonant inverter 20 to achieve color mixing by excitation of the second longitudinal acoustic mode will now be described in detail. In order to achieve color mixing by excitation of the second longitudinal acoustic mode, the power to the HID lamp 50 must be modulated at the frequency of the second longitudinal acoustic mode. In the exemplary embodiment, the second longitudinal acoustic mode is approximately 24 kHz.

The method of the present invention derives the necessary power modulation by modulating the duty cycle of transistors or switches S1 and S2 while keeping the switching frequency constant. In general, the power to the load presented by the HID lamp 50 is at a maximum when the duty cycle is 50% or 0.5. As the duty cycle is decreased or, alternately, increased from 50%, the load power will decrease. Thus, the load power can be modulated simply by modulating the duty cycle appropriately so that it is increased and decreased about the nominal value.

To create a 24 kHz modulation of the load power, the duty cycle (DC) can be switched between 50% and 40% at a frequency of 12 kHz. Since the second longitudinal acoustic mode of the HID lamp 50 is 24 kHz, the load power will be modulated by a first amount. On the other hand, by varying the duty cycle (DC) between 50% and 30%, the load power will be modulated by a second amount wherein the second amount is larger than the first amount. As can be appreciated, the degree of excitation of the second longitudinal acoustic mode can be varied and controlled. Thus, modulating the duty cycle DC in a manner which varies the duty cycle DC accordingly, modulates the load power in a manner to excite the second longitudinal acoustic mode in the HID lamp 50 operated at VHF to achieve color mixing or, in other words, to minimize, if not eliminate, vertical segregation.

The duty cycle DC can be modulated with a sinusoidal function or other symmetrical waveform functions. Only one example of a modulated duty cycle will be described in detail since there are numerous modulation functions and to describe such functions is prohibitive. An exemplary sinusoidally modulated duty cycle ($DC_m$) can be expressed as $$DC_m = DC_n + a_m \sin(2*pi*f_m*t) \quad \text{Eq.(1)}$$

wherein $DC_n$ is the nominal value of the duty cycle; $a_m$ is a modulation index; and $f_m$ is the modulation frequency. In the exemplary embodiment, the $DC_n$ is substantially 0.5 or 50%; the modulation index $a_m$ varies between 0 and 0.5; and the modulation frequency $f_m$ is set to substantially one-half (½) of the frequency of the second longitudinal acoustic mode. The modulation index $a_m$ controls the amount of power or degree of excitation in the HID lamp 50 at a frequency of twice the modulation frequency $f_m$. The modulation index is varied according to the desired degree of excitation of the second longitudinal acoustic mode. By increasing the modulation index, more power is delivered to the lamp at the second longitudinal acoustic mode. In practice, there is a balance between exciting the second longitudinal acoustic mode to get color mixing, while not over-exciting which could lead to lamp instabilities. The modulated power is independent of the carrier frequency as long as the carrier frequency is reasonably higher than the modulating frequency. If the carrier frequency is varied, the modulated power is still fixed. Thus, for other applications it would be possible to apply frequency modulation, e.g., sweep the carrier frequency from 450 kHz to 550 kHz, without substantially altering the modulated power component at 24 kHz.

In view of the foregoing, the above modulation function is only one suitable function which can be used to modulate the duty cycle to control the amount of power or degree of excitation of the HID lamp 50.

In an exemplary example, the HID lamp 50 is operated at a VHF of approximately 500 kHz, as best seen in FIG. 3. FIG. 3 illustrates an exemplary sinusoidal lamp voltage waveform of substantially 500 kHz. The lamp voltage waveform is represented in volts (−600V to +600V) verses time in seconds (0.001 s to 0.0018 s). The modulation frequency $f_m$ is approximately 12 kHz at a depth of 0.2. In other words, the duty cycle varies from 0.3 (30%) to 0.7 (70%) around the nominal duty cycle $DC_n$ of 0.5 (50%), as best seen in FIG. 2. FIG. 2 illustrates an exemplary waveform of a sinusoidally modulated duty cycle ($DC_m$) with a modulation frequency $f_m$ of approximately 12 kHz. The waveform is represented as volts (0.0V to 1.0V) verses time in seconds. In operation, the 12 kHz duty cycle modulation of FIG. 2 creates a substantially 24 kHz frequency component in the load power spectrum, as best seen in FIG. 4. FIG. 4 illustrates the power spectrum of this exemplary example. The power spectrum waveform is represented as dB(−jHz) (−80 to +60) verses frequency in Hertz (0.0 to 1.25 meg).

In view of the foregoing, for an exemplary HID lamp 50 with a second longitudinal acoustic mode at approximately 24 kHz, a fixed and controlled frequency excitation at 24 kHz may be used to excite acoustic resonances to create color mixing or, in other words, to minimize, if not eliminate, vertical segregation.

In summary, the above is a general method of injecting controlled frequency components into a load that is operated at very high frequencies (VHF). Thus, utilizing more complex duty cycle modulation schemes will allow more complex frequency excitation to be coupled into the load.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method of color mixing an HID lamp, comprising the steps of:
   (a) operating a high intensity discharge (HID) lamp at a very high frequency (VHF);
   (b) modulating a duty cycle of a half bridge configured resonant inverter; and,
   (c) exciting a second longitudinal acoustic mode of the HID lamp with the half bridge configured resonant inverter to achieve color mixing along a vertical axis of the HID lamp.

2. The method according to claim 1, further comprising:
   (d) providing a constant switching frequency to the half bridge configured inverter.

3. The method according to claim 1, wherein the step (b) includes modulating the duty cycle at a modulation frequency which is equal to substantially one-half of a frequency of the second longitudinal acoustic mode.

4. The method according to claim 1, wherein the step (b) effectuates power modulation to the HID lamp at a frequency of the second longitudinal acoustic mode.

5. The method according to claim 1, wherein the VHF is approximately 500 kHz.

6. The method according to claim 1, wherein the step (b) includes modulating the duty cycle with a sinusoidal function.

7. The method according to claim 1, wherein the duty cycle has a nominal value of 50% and varies symmetrically about the nominal value plus or minus 20%.

8. A method for color mixing an HID lamp, comprising the steps of:
   (e) operating a high intensity discharge (HID) lamp at a very high frequency (VHF);
   (f) modulating a duty cycle of a half bridge configured resonant inverter to effectuate power modulation to the HID lamp at a frequency of a second longitudinal acoustic mode; and,
   (g) exciting the second longitudinal acoustic mode of the HID lamp with the half bridge configured resonant inverter to achieve color mixing along a vertical axis of the HID lamp.

9. The method according to claim 8, further comprising:
   (h) providing a constant switching frequency to the half bridge inverter.

10. The method according to claim 8, wherein the step (b) includes modulating the duty cycle at a modulation frequency which is equal to substantially one-half of a frequency of the second longitudinal acoustic mode.

11. The method according to claim 8, wherein the VHF is approximately 500 kHz.

12. The method according to claim 8, wherein the step (b) includes modulating the duty cycle with a sinusoidal function.

13. The method according to claim 8, wherein the duty cycle has a nominal value of 50% and varies symmetrically about the nominal value plus or minus 20%.

14. A half bridge configured resonant inverter for powering a high intensity lamp (HID), comprising:
- a half bridge circuit operating the HID lamp at a very high frequency (VHF), having a constant switching frequency and having a modulated duty cycle to effectuate power modulation to the HID lamp, which excites a second longitudinal acoustic mode of the HID lamp to achieve color mixing or reduction in vertical segregation along a vertical axis of the HID lamp;
- a resonant filter coupled between the half bridge circuit and the HID lamp.

15. The inverter according to claim 14, wherein the modulated duty cycle has a modulation frequency which is equal to substantially one-half of a frequency of the second longitudinal acoustic mode.

16. The inverter according to claim 14, wherein the VHF is approximately 500 kHz.

17. The inverter according to 14, wherein the modulated duty cycle is modulated with a sinusoidal function.

* * * * *